US008175522B1

(12) United States Patent
Coleman et al.

(10) Patent No.: US 8,175,522 B1
(45) Date of Patent: May 8, 2012

(54) SENDING MESSAGES FROM A COMPUTING DEVICE

(75) Inventors: Keith J. Coleman, Palo Alto, CA (US); Gabor Cselle, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/250,214

(22) Filed: Sep. 30, 2011

Related U.S. Application Data

(63) Continuation of application No. 13/184,796, filed on Jul. 18, 2011.

(51) Int. Cl.
H04B 7/15 (2006.01)
(52) U.S. Cl. ....... 455/11.1; 455/7; 455/13.1; 455/412.1; 455/412.2; 455/414.1; 455/435.1; 455/435.2; 455/418; 455/466; 370/351; 370/352; 370/353; 370/355; 370/356; 709/206; 709/228; 709/229; 709/231; 709/238; 709/239; 709/248; 709/250
(58) Field of Classification Search ............. 455/7, 11.1, 455/13.1, 412.1, 412.2, 414.1, 435.1, 435.2, 455/418, 466; 370/351, 352, 353, 354, 355, 370/356
See application file for complete search history.

(56) References Cited

U.S. PATENT DOCUMENTS

| 6,085,231 | A  | * | 7/2000  | Agraharam et al. | 709/206 |
| 6,611,516 | B1 | * | 8/2003  | Pirkola et al.   | 370/352 |
| 7,269,431 | B1 | * | 9/2007  | Gilbert          | 455/466 |
| 7,369,865 | B2 | * | 5/2008  | Gabriel et al.   | 455/466 |
| 7,546,131 | B1 |   | 6/2009  | Sidi et al.      |         |
| 7,720,494 | B2 | * | 5/2010  | Ahn              | 455/466 |
| 7,865,175 | B2 | * | 1/2011  | Jordan, Jr.      | 455/412.1 |
| 2002/0031206 | A1 | * | 3/2002 | Matsunsami      | 379/67.1 |
| 2003/0220979 | A1 | * | 11/2003 | Hejl            | 709/206 |

FOREIGN PATENT DOCUMENTS

WO    WO2008/045971    4/2008

OTHER PUBLICATIONS

"Text Messaging Via the Internet", Lockergnome.com / Windows Fanatics##, [online], Retrieved from the Internet: <URL http://www.lockergnome.com/windows/2006/03/01/text-messaging-via-the-internet/#>, (posted Mar. 1, 2006).
"SMS Tutorial: How to Send SMS Messages from a Computer/PC Using a Mobile Phone or GSM/GPRS Modem? AT Commands", Developershome.com, [online] Retrieved from the Internet: <URL: http://www.developershome.com/sms/howToSendSMSFromPC.asp >, [retrieved on Feb. 14, 2011].
Norwood, B., "SMS through internet to hand phone", Forum Posting on NowSMS.com, [online] Retrieved from the Internet: <URL: http://www.nowsms.com/discus/messages/1/1330.html>, (Nov. 17, 2003).

(Continued)

Primary Examiner — Olumide T Ajibade Akonai
(74) Attorney, Agent, or Firm — Fish & Richardson P.C.

(57) ABSTRACT

Systems include configuring a first mobile device to enable communication between the first mobile device and one or more processing devices; receiving a message from a computing device that is directed to a second mobile device, where the message is a text message or a voice message, and where the computing device is different from the first mobile device; and routing the message to the first mobile device for transmission to the second mobile device from the first mobile device.

21 Claims, 7 Drawing Sheets

OTHER PUBLICATIONS

"Send SMS from PC through Android Phone", Forum Discussion on Super User.com, [online], Retrieved from the Internet: <URL: http://superuser.com/questions/86076/send-sms-from-pc-through-android-phone>, (Dec. 2009-Dec. 2010).

"Send Free International SMS Message Online From PC, Web and Email", Geckoandfly.com, [online], Retrieved from the Internet: <URL: http://www.geckoandfly.com/3357/send-free-international-sms-message-online-from-pc-web-and-email/>, (Feb. 2009).

"How to Use a Windows PC to Send and Receive SMS Messages (Non-Developer's Perspective)", Developershome.com, [online], Retrieved from the Internet: <URL: http://www.developershome.com/sms/smsWindows.asp>, [retrieved on Feb. 14, 2011].

"How to Send Text Message From Your Computer", posting on eHow.com, [online], Retrieved from the Internet: <URL: http://www.ehow.com/how_5053939_send-text-message-computer.html>, (Jan. 2010).

Agarwal, A., "Send SMS Text Messages from Computer to Mobile Phone via Outlook", Digital Inspiration, [online], Retrieved from the Internet: <URL: http://www.labnol.org/software/tutorials/send-receive-sms-text-messages-from-pc-computer-to-mobile-phone-outlook/2866/>, (Aug. 4, 2008).

Notenboom, L., "Can I send text messages between a computer and a cell phone?", on Ask-Leo.com, [online], Retrieved from the Internet: <URL http://ask-leo.com/can_i_send_text_messages_between_a_computer_and_a_cell_phone.html>, (Feb. 28, 2006).

"EasySMS—Remote Desktop SMS for Android", on Fireblade.org, [online], Retrieved from the Internet: <URL: http://www.fireblade.org/EasySMS/>, (Jan. 2011).

Preliminary Search results on "Sending an SMS (text message) From A Computer to Simulate Sending From a Phone", Thomson Reuters / Thomson Innovation, performed Mar. 18, 2011.

Office Action issued in U.S. Appl. No. 13/184,796 dated Feb. 9, 2012.

* cited by examiner

SENDING MESSAGES FROM A COMPUTING DEVICE

CROSS-REFERENCE TO RELATED APPLICATION

This application is a continuation of U.S. application Ser. No. 13/184,796, filed Jul. 18, 2011, the entirety of which is hereby incorporated by reference as if fully set forth therein.

TECHNICAL FIELD

This patent application relates generally to sending messages, such as short message service (SMS) and voice messages, from a computing device.

BACKGROUND

SMS messages are short text messages that may be sent between mobile communication devices, such as cellular telephones. SMS messages may also be sent from computing devices, such as personal computers. For example, Web-based services allow computing devices to send SMS messages.

When an SMS message is sent from a user's mobile communication device, the recipient of the SMS message typically sees the source of that SMS message as the number associated with the mobile communication device. This is not the case when text messages are sent from Web-based services. The same is true for voice (VoIP—voice over Internet Protocol) messages sent from a user's computer.

SUMMARY

This patent application describes systems and techniques for sending messages, such as short message service (SMS) messages and voice messages, from a computing device.

For example, this patent application describes systems and techniques that may include configuring a first mobile device to enable communication between the first mobile device and one or more processing devices; receiving a message from a computing device that is directed to a second mobile device, where the message is a text message or a voice message, and where the computing device is different from the first mobile device; and routing the message to the first mobile device for transmission to the second mobile device from the first mobile device. The systems and techniques may include any one or more features described in this application, examples of which are as follows.

Configuring the first mobile device may include enabling an operating system of the first mobile device to route messages from the one or more processing devices. Configuring the first mobile device may include transmitting an application to the first mobile device. The application may be for routing messages from the one or more processing devices. A corresponding application executed by the one or more processing devices may synch with the application on the first mobile device to perform the routing. The message may be stored in an inbox so that the message is accessible via an account associated with the first mobile device.

This patent application also describes systems and techniques that may include receiving, from a source device, a first message directed to a mobile device, where the first message is a text message or a voice message; sending the first message to a computing device in response to a request from the computing device; receiving, from the computing device, a second message, where the second message includes a response to the first message, and where the second message is an SMS message or a voice message; and sending the second message to the mobile device for transmission to the source device. The systems and techniques may include any one or more features described in this application, examples of which are as follows.

The systems and techniques may include determining that the mobile device is registered to enable routing of messages via one or more processing devices. The determining may be performed based on an identifier associated with the source device. The systems and techniques may include making the first message accessible for retrieval, and the request may include a network protocol command. Making the first message accessible for retrieval may include storing the first message in an inbox as a hyperlink. Prior to receiving the first message, a message application may be downloaded to at least one of the source device and the mobile device.

All or part of the systems and techniques described herein may be implemented as a computer program product that includes instructions that are stored on one or more non-transitory machine-readable storage media, and that are executable on one or more processing devices. Examples of non-transitory machine-readable storage media include e.g., read-only memory, an optical disk drive, memory disk drive, random access memory, or the like. All or part of the systems and techniques described herein may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Described herein is a system for sending messages from a computing device. In an example, the system includes a server for configuring a first mobile device to enable communication with the server; and for receiving a message from a computing device that is directed to a second mobile device. Here, the message is a short message service (SMS) message or a voice message, and the computing device is different from the first mobile device. The server is also for routing the message to the second mobile device via the first mobile device such that the message appears to have originated from the first mobile device.

Figure 1:
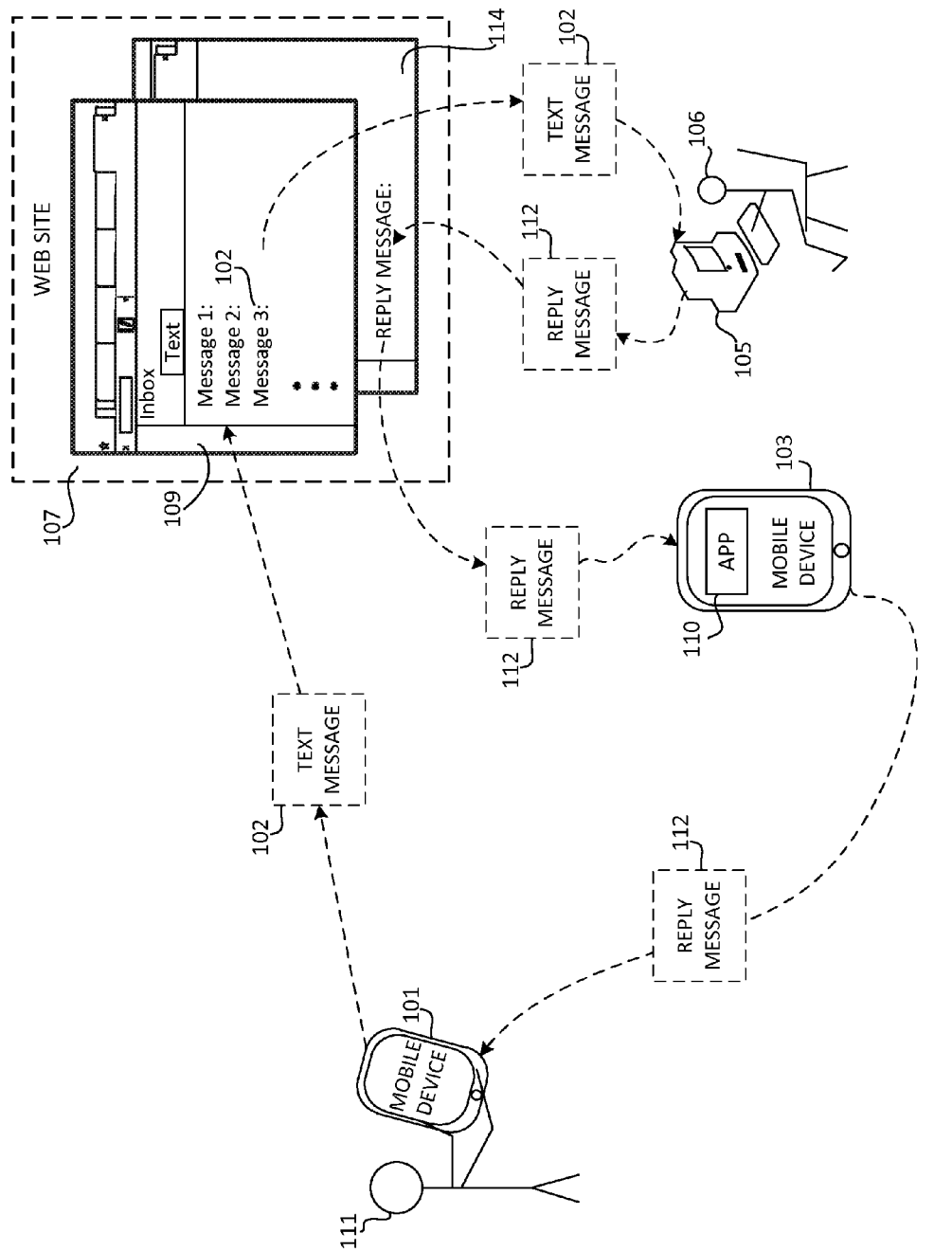
FIG. 1 is a conceptual view of a process for sending messages from a computing device via a mobile device.

FIG. 1 shows an example operation of the foregoing system. Specifically, FIG. 1 shows a process in which a first mobile device 101 (e.g., a cellular telephone) sends a text message 102 directed to a second mobile device 103, in which a computing device (e.g., a personal computer 105) responds to that text message, and in which that response is routed through second mobile device 103. In FIG. 1, the message is an SMS message; however, the processes described herein may be used with other types of messages, such as voice messages.

In FIG. 1, prior to exchange of messages, user 106 registers mobile device 103 with Web site 107. Web site 107 may be hosted by one or more servers, which may be on a network communication path between the mobile devices. In an example, registration may include establishing an account with Web site 107. In this example, text messages passing through a server (not shown in FIG. 1) are associated with the account, and controlled (e.g., routed) in accordance with settings associated with the account. For example, user 106 may create an account with Web site 107 using the phone number of mobile device 103. The account may be associated with that phone number, and may contain configurable features, such as options to display text messages in an inbox 109, options to route text messages, and options to queue text messages for timed delivery.

As part of the account creation process, an application (or "app") 110 may be downloaded to mobile device 103. App 110 may be used to synch to Web site 107 for transmission and retrieval of messages, as described below. App 110 may be downloaded from Web site 107 via a download module, from a server associated with Web site 107, or from another source, such as a virtual store, which is not shown in FIG. 1. Alternatively, app 110 may be built into mobile device 103 (e.g., stored in mobile device 103 when the operating system for mobile device 103 is installed). In another alternative, the functionality of app 110 may be built into the operating system of mobile device 110.

In operation, a user 111 sends text message 102 from mobile device 101. Text message 102 is directed to mobile device 103, but passes through Web site 107. More specifically, Web site 107 (or, generally, code on a server that hosts Web site 107) intercepts text message 102 and stores the text message in inbox 109. The text message may be stored as a document, and associated with a hyperlink, and may be retrieved by an HTTP (hypertext transfer protocol) command initiated e.g., by a user pointing and clicking on the hyperlink using a computer mouse. In some implementations, the text message may also be sent to mobile device 103 concurrently. In such a case, the text message may appear both on the mobile device and in the inbox, and may be responded to from either or both of those locations.

A reply to the text message may be sent from mobile device 103. This may be done in a standard manner, e.g., by selecting a "reply" prompt, typing the reply, and selecting a send prompt. Alternatively, a reply to the text message may be sent from a computing device, such as personal computer (PC) 105. Although a PC is shown in this example, the computing device may be any type of computing device, as described in more detail below. To reply to the text message from PC 105, user 106 may log into their account on Web site 107 using PC 105. Web site 107 displays the user's inbox 109. Inbox 109 may list text messages, including text message 102, in the order that they are received, or in any other order.

User 106 retrieves text message 102, e.g., by pointing-and-clicking on the corresponding hyperlink using a computer mouse. The resulting HTTP interaction causes text message 102 to be sent from Web site 107 to a Web browser running on PC 105. The resulting images of the inbox and text message are displayed on a monitor associated with PC 105. User 106 may reply to the text message via PC 105; however, the reply message 112 is routed through the user's telephone (mobile device 103). As a result, the recipient of the reply message (mobile device 101) will see, associated with the reply message, the telephone number (or other identifier) of mobile device 103. Furthermore, because reply message 112 is routed through mobile device 103, there need be no disruption in the cellular carrier's business model (e.g., if the user's cellular carrier charges mobile device 103 per text message, the process described herein need not act as a work-around for such charges). This can be advantageous because some carriers will block apps that attempt work-arounds for their standard charges.

To reply to text message 102, user 106 at PC 105 may simply click-on a reply prompt (not shown), type text for the reply message, and click-on a send prompt. The reply message 112 is then packaged by PC 105 and sent back to Web site 107. There, the reply message may be stored in an outbox 114, and associated with a hyperlink that allows the reply message to be viewed by the owner of the account. The reply message is then sent to app 110 on the user's mobile device 103. That is, app 110 is synched to Web site 107. Web site 107 may push text messages received at the user's account to mobile device 103. Alternatively, app 110 may periodically poll the user's account for text messages that need to be sent.

In any case, app 110 in mobile device 103 receives reply message 112, which includes information identifying the intended recipient (e.g., the phone number of mobile device 101). App 110 sends the reply message 112 to mobile device 101, where the reply message is received. Mobile device 101 receives the reply message, which appears as a normal text message sent from mobile device 103. Thus, the process routes text messages from a computing device, such as PC 105, through both a server and user's mobile device, making it appear as if the text message originated at the user's mobile device.

In this regard, in the example shown in FIG. 1, the text message being routed is a reply message. However, the text message need not be a reply message, but rather can be an initial message sent from PC 105 to mobile device 101. In this case, a text message is sent from PC 105 to outbox 114, and then through mobile device 103 in the manner described above.

The process described with respect to FIG. 1 may be implemented on any appropriate network, with any appropriate devices and computing equipment.

Figure 2:
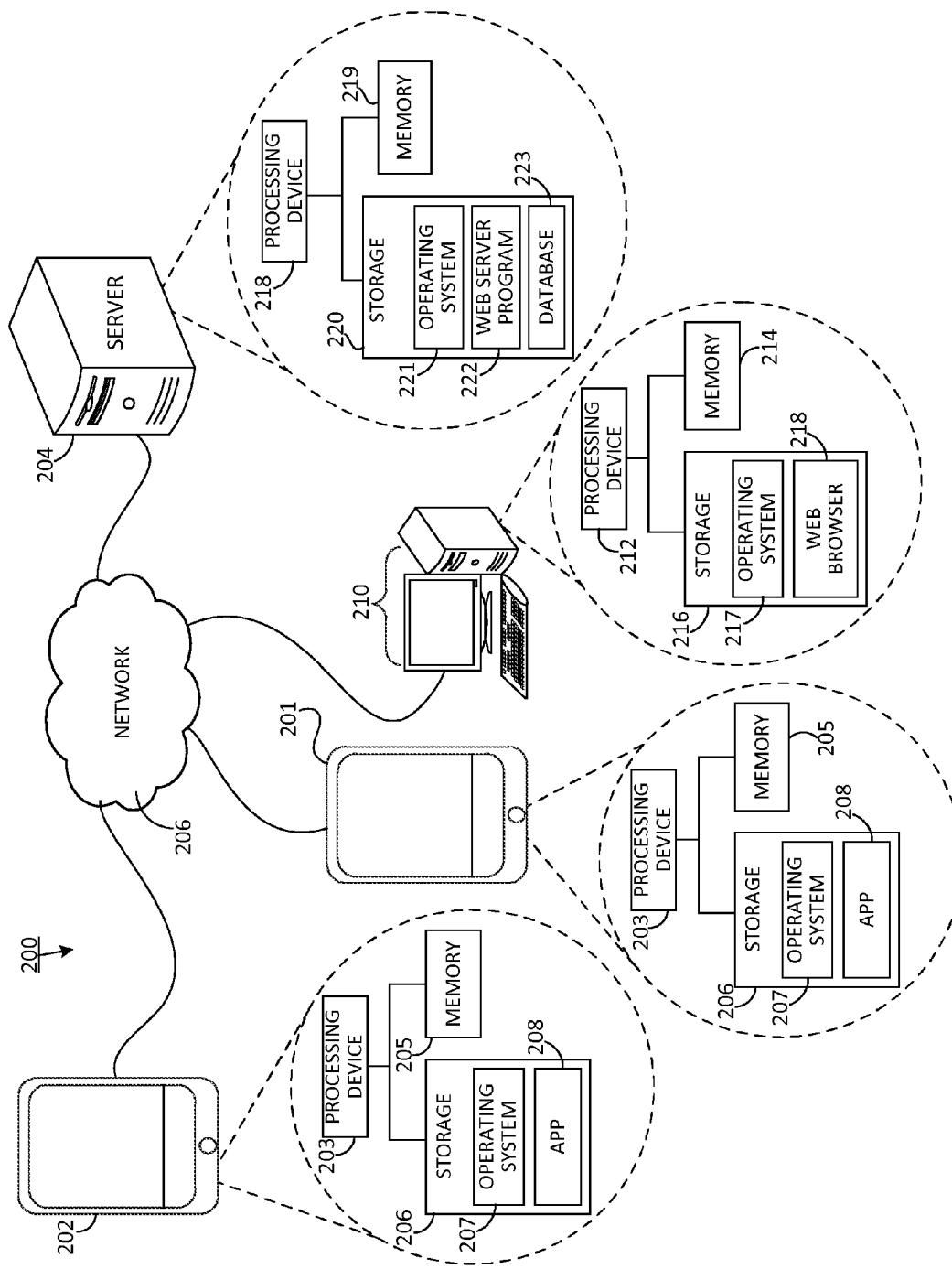
FIG. 2 is a block diagram of a network and components that may be used to perform the process of FIG. 1.

FIG. 2 is a block diagram of an example of a system 200 on which the process of FIG. 1 may be implemented. Mobile devices 201 and 202 are examples of mobile devices 101 and 103 from FIG. 1. Mobile devices 201 and 202 can be representative of various forms of mobile computing devices. Examples of mobile devices 201 and 202 can include a cellular telephone, personal digital assistant (PDA), and a smartphone. Mobile devices 201 and 202 can communicate with server 204 via network 206, which may include one or more networks.

Mobile devices 201 and 202 may each include one or more processing devices 203, memory 205, and a storage system 206. Storage system 206 can include an operating system (OS) 207, and an app 208 for retrieving and sending text messages in the manner described above with respect to FIG. 1. App 208 may be the same as app 110 of FIG. 1.

Computing device 210 may include one or more processing devices, and may be, or include, a laptop computer, a handheld computer, a tablet computer, a network appliance, a camera, an enhanced general packet radio service (EGPRS) mobile phone, a media player, a navigation device, an email device, a game console, or a combination of any two or more of these data processing devices or other data processing devices. In some implementations, the computing device can be included as part of a motor vehicle (e.g., an automobile, an emergency vehicle (e.g., fire truck, ambulance), a bus). In some implementations, the personal computing device can be included as part of a desktop computer. Computing device 210 may be the same as computing device 105 of FIG. 1.

Computing device 210 includes one or more processing devices 212, memory 214 and a storage system 216. Storage system 216 can include an operating system (OS) 217, and a Web browser 218 such as GOOGLE CHROME, MICROSOFT INTERNET EXPLORER, APPLE SAFARI or MOZILLA FIREFOX for accessing Web site 107.

Server 204 can represent various forms of servers, such as a web server, an application server, a proxy server, a network server, or a server farm. Server 204 can include one or more processing devices 218, memory 219 and a storage system 220. Storage system 220 can include an operating system (OS) 221 and a Web server program 222 to host Web site 107 and to route text and other messages between mobile devices and an inbox and an outbox maintained by the Web site. Server 204 also includes a database 223 for storing information, such as user account information and settings.

Network 206 can represent a mobile communications network that can allow devices (e.g., mobile devices 201 and 202) to communicate wirelessly through a communication interface (not shown), which may include digital signal processing circuitry where necessary. Network 206 can include one or more networks available for use by the mobile devices 201 and 202 for communication with server 204. The network(s) may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver. In addition, short-range communication may occur, such as using a Bluetooth, WiFi, or other such transceiver.

Figure 3:
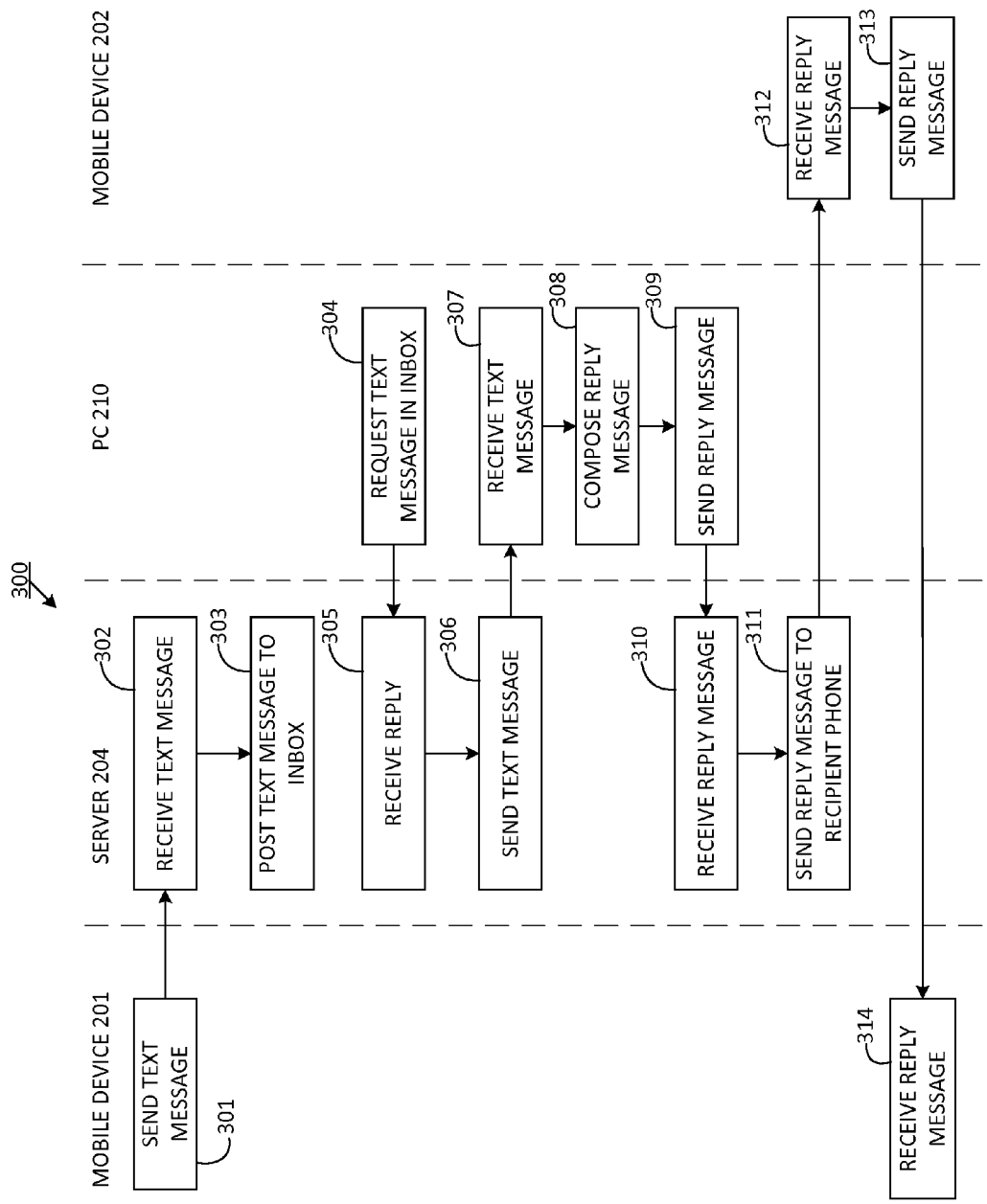
FIG. 3 is a flowchart showing an example of the process of FIG. 1.

FIG. 3 is a flowchart showing an implementation performed on the system shown in FIG. 2. The example implementation of FIG. 3, like that of FIG. 1, deals with a reply to a text message. However, the process shown in FIG. 3 is also applicable to text messages initiated by a sender (i.e., not in reply to a prior message).

According to process 300, a sender's mobile device 201 sends (301) a text message (here, an SMS message). The text message is routed through network 206, and is received (302) by server 204. Code (e.g., a text message module) running in server 204, and associated with (e.g., part of) Web site 107, examines the text message to identify the destination of the text message. For example, the text message may contain the telephone number of mobile device 202. In this example, the code identifies this telephone number, and determines whether there is a user account associated with that telephone number. Other information, such as the owner of the mobile device or another identifier of the mobile device, may be used to identify the destination.

Figure 4:
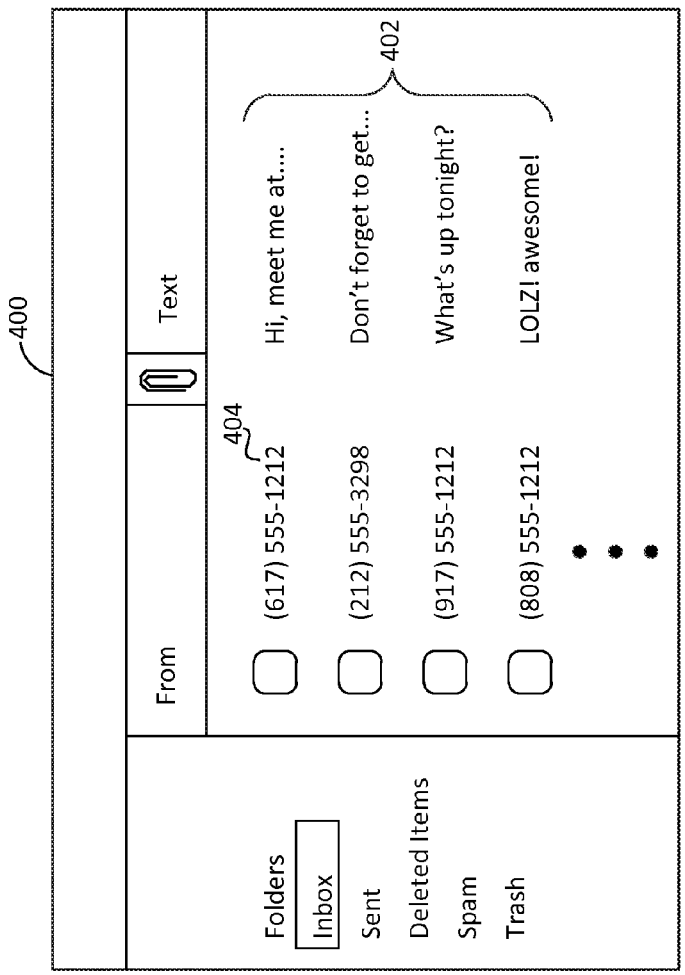
FIG. 4 is a screenshot showing an example of an inbox.
Figure 5:
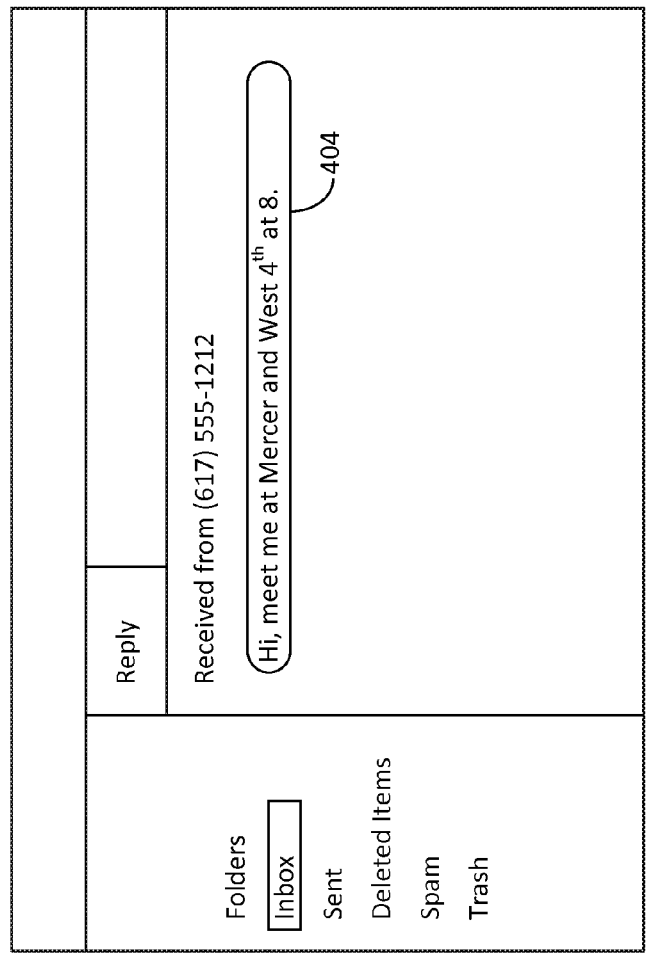
FIG. 5 is a screenshot showing an example of a text message displayed in the inbox.

Once the user account for the text message is identified, the text message is posted (303) in an inbox associated with that user account. As explained above, the inbox may be part of a Web page, and the text message may be posted as a hyperlink that is accessible to computing device (e.g., PC) 210. An example of such an inbox 400 is shown in FIG. 4. There, text messages 402, ordered by delivery time, are listed. In this example, each text message is listed by the phone number of the mobile device that sent the message. Each number may be a hyperlink to an underlying text message. A user at PC 210 can access the text message by pointing-and-clicking on a link for text message 404 using a computer mouse. For example, clicking on the hyperlink for text message 404 causes the content of the text message to be displayed as shown, for example, in FIG. 5.

Figure 6:
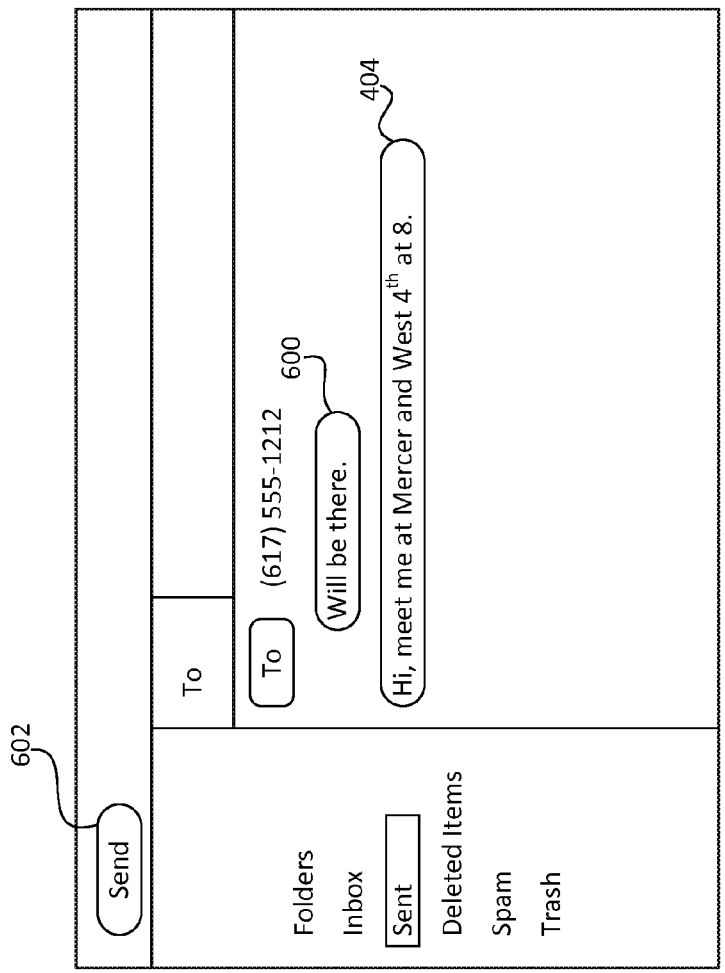
FIG. 6 is a screenshot showing an example of a reply message displayed in the inbox.

Referring back to FIG. 3, a user at PC 210 accesses Web site 107 using a Web browser. From there, the user logs into their account, and accesses their inbox 400. The user can reply to a text message listed there. The reply process is as follows. PC 210 requests (304) a text message from inbox 400, for which a reply message is to be sent. This may be done using an HTTP connection established by pointing-and-clicking on the corresponding hyperlink. In particular, server 204 (e.g., Web server program 222) receives (305) the request and sends (306) the text message to the user's Web browser, where the text message is received (307). The user composes (308) a reply message, such as the reply message 600 shown in FIG. 6, and clicks-on a send prompt 602 to send (309) the reply message to a designated recipient.

Instead of routing the text message from server 204 directly to the recipient's mobile device 201, process 300 routes the message from server 204, through the user's mobile device 202, and then to the recipient's mobile device 201. More specifically, the reply message is sent from PC 210 to Web site 107 in server 204, where the reply message is received (310) and stored in the user's inbox outbox, at least temporarily. Messages stored in the user's outbox may also be associated with hyperlinks, which allow account owners to read message content through pointing-and-clicking.

App 208 on the user's mobile device 202 is synched to Web site 107 so that app 208 automatically receives text messages from the user's outbox. For example, app 208 may periodically poll Web site 107 to determine if there are any text messages in the outbox, and to retrieve any such text messages. Alternatively, Web site 107 may push text messages from the outbox to app 208. Text messages may be pushed in real-time, e.g., as they arrive in the outbox. Alternatively, text messages may be pushed individually or in groups periodically to app 208.

Server 204 therefore sends (311) the reply message to app 208 in mobile device 202. App 208 receives (312) the reply message, and sends (313) the reply message to the recipient's mobile device 201. App 208 may package the reply message to make the reply message appear as if it originated at the user's mobile device 202 (instead of at PC 210 or server 204). For example, app 208 may strip any headers or metadata added to the text message data packets by PC 210 or server 204, and repackage the resulting data with appropriate header(s) and/or metadata specific to mobile device 202. In an example, only the text is left from the original message, and that text is re-packaged with appropriate header(s) and/or metadata specific to mobile device 202, making the resulting message appear as if the message originated at mobile device 202. App 208 sends (313) the reply message to the recipient's mobile device 201, where the text message is received (314). When the recipient views the text message, the text message appears as if it originated from the user's mobile device 202. Moreover, the text message is sent over the mobile device's cellular carrier, thereby incurring any charges or other fees associated with the mobile device's cellular plan.

In the example of FIG. 3, the text message being routed is a reply message. However, the text message need not be a reply message, but rather can be an initial message sent from PC 210 and directed to mobile device 201. In this case, a text message is sent from PC 210 to server 204, and then through mobile device 202 in the manner described above. The recipient may then reply to that text message, in which case process 300 continues starting from block 301.

Figure 7:
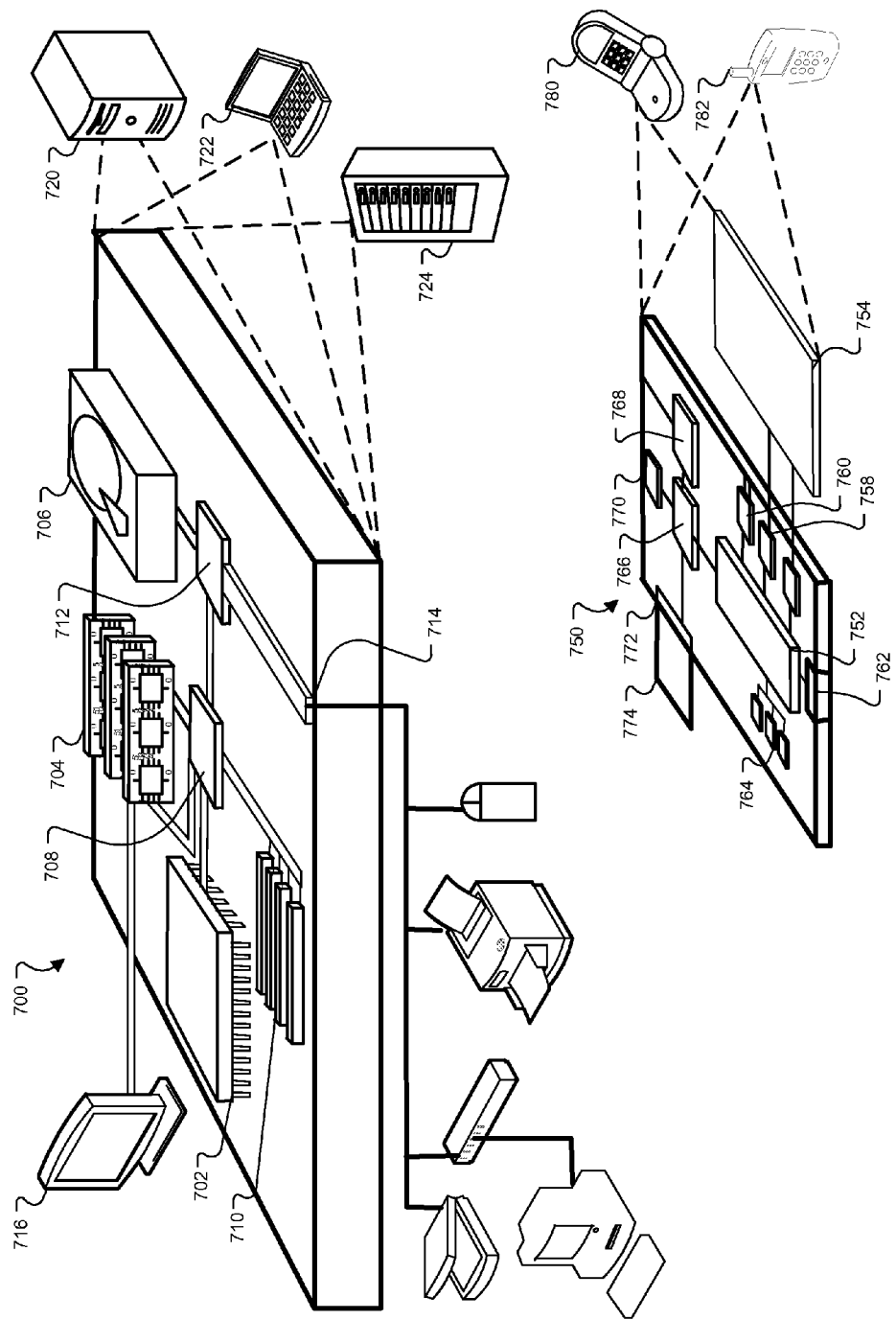
FIG. 7 shows examples of computer devices that may be used to perform the process, or elements thereof, depicted in FIGS. 1 to 6.

FIG. 7 shows an example of a generic computer device 700 and a generic mobile computer device 750, which may be used to implement the process and any variations thereto described herein, including the mobile device-side actions, the computing device-side actions, and server-side actions. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, tablets and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various buses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be embodied in a tangible information carrier. The computer program product may also contain instructions that, when executed, perform one or more methods, such as those described above. The information carrier may be a non-transitory computer- or machine-readable medium, such as the memory 704, the storage device 706, or memory on processor 702. For example, the information carrier may be a non-transitory, machine-readable storage medium.

The high-speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. A display screen, such as an LCD (Liquid Crystal Display) or a CRT (Cathode Ray Tube) displays, to a user, images that are generated by a client including, but not limited to, the graphical user interfaces herein. As is well known, display on a display screen (e.g., a monitor) physically transforms the display screen. For example, if the display screen is LCD-based, the orientation of liquid crystals can be changed by the application of biasing voltages in a physical transformation that is visually apparent to the user. As another example, if the display screen is a CRT, the state of a fluorescent screen can be changed by the impact of electrons in a physical transformation that is also visually apparent.

The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

The processes described herein route messages from a computing device (e.g., PC 210) through a separate mobile device (e.g. a cellular telephone) without requiring a direct wired (e.g., USB) or wireless (e.g. Bluetooth), connection between the computing device and the mobile device.

The processes described herein are not limited to use with SMS messages, but rather may be used to transmit any appropriate messages including, but not limited to, those described herein, such as MMS, EMS and group SMS (e.g., from choose multiple recipients from the computer, and an SMS message is to all of them).

The foregoing processes focus on routing text messages. However, the processes may be used to route voice messages (e.g., VoIP—voice over Internet Protocol—messages) through a user's mobile device. For example, a telephone call may be placed from the user's PC 210 and the resulting voice message routed through the user's mobile device in the manner described in FIG. 3. The voice message with therefore appear, to the recipient, to have originated at the user's mobile device, rather than at the user's PC. Audio files containing voice messages may be stored in the inbox/outbox, and accessed via hyperlinks, in the manner described above.

Web site 107 may be a web site dedicated to processing messages in the manner described herein, or this type of processing may be a feature of that site. For example, the Web site may primarily be an e-mail service, but also provide the routing features described herein. In the examples described herein, the messages are SMS messages; however, the processes described herein may be used with other types of text messages.

The processes described herein are not limited to the protocols described herein. For example, other communication protocols may be substituted for HTTP. For example, HTTPS, TCP, UDP, or IP communications may be used in place of HTTP communications.

Other implementations not specifically described herein are also within the scope of the following claims.

What is claimed is:

1. A method, performed by one or more processing devices, comprising: enabling communication between a first mobile device and the one or more processing devices, wherein communication is enabled after transmission of an application to the first mobile device, the application for routing messages received from the one or more processing devices; receiving a message from a computing device that is directed to a second mobile device, the message being a text message or a voice message, the computing device being different from the first mobile device; and routing the message to the first mobile device for transmission to the second mobile device from the first mobile device, wherein a corresponding computer program executed by the one or more processing devices synchs with the application on the first mobile device to route the message to the application.

2. The method of claim 1, further comprising: storing the message in an inbox so that the message is accessible via an account associated with the first mobile device.

3. A method performed by one or more processing devices, comprising:

receiving, from a source device, a first message directed to a mobile device, the first message being a text message or a voice message, wherein the source device comprises a first application for routing messages between the source device and the mobile device via the one or more processing devices; sending the first message to a computing device in response to a request from the computing device, the one or more processing devices executing a computer program to send the first message to the computing device; receiving, from the computing device and at the computer program, a second message, the second message comprising a response to the first message, the second message being an SMS message or a voice message; and sending the second message to the mobile device for transmission to the source device, the computer program synching with a second application on the mobile device to perform the sending.

4. The method of claim 3, further comprising: determining that the mobile device is registered to enable routing of messages via the one or more processing devices, wherein determining is performed based on an identifier associated with the mobile device.

5. The method of claim 3, further comprising making the first message accessible for retrieval; wherein the request comprises a network protocol command.

6. The method of claim 5, wherein making the first message accessible for retrieval comprises storing the first message in an inbox as a hyperlink.

7. The method of claim 3, further comprising: prior to receiving the first message, sending the first application to the source device or sending the second application to the mobile device.

8. One or more non-transitory machine-readable media that store instructions that are executable by one or more processing devices to perform operations comprising: enabling communication between a first mobile device and the one or more processing devices, wherein communication is enabled after transmission of an application to the first mobile device, the application for routing messages received from the one or more processing devices; receiving a message from a computing device that is directed to a second mobile device, the message being a text message or a voice message, the computing device being different from the first mobile device; and routing the message to the first mobile device for transmission to the second mobile device from the first mobile device, wherein a corresponding computer program that is executable by the one or more processing devices is configured to synch with the application on the first mobile device to route the message to the application.

9. The one or more non-transitory machine-readable media of claim 8, wherein the operations comprise: storing the message in an inbox so that the message is accessible via an account associated with the first mobile device.

10. One or more non-transitory machine-readable media that store instructions that are executable by one or more processing devices to perform operations comprising: receiving, from a source device, a first message directed to a mobile device, the first message being a text message or a voice message, wherein the source device comprises a first application for routing messages between the source device and the mobile device via the one or more processing devices; sending the first message to a computing device in response to a request from the computing device, the instructions being executable to execute a computer program to send the first message to the computing device; receiving, from the computing device and at the computer program, a second message, the second message comprising a response to the first message, the second message being an SMS message or a voice message; and sending the second message to the mobile device for transmission to the source device, the instructions for causing the computer program to synch with a second application on the mobile device to perform the sending.

11. The one or more non-transitory machine-readable media of claim 10, wherein the operations comprise: determining that the mobile device is registered to enable routing of messages via the one or more processing devices, wherein determining is performed based on an identifier associated with the mobile device.

12. The one or more non-transitory machine-readable media of claim 10, wherein the operations comprise making the first message accessible for retrieval; wherein the request comprises a network protocol command.

13. The one or more non-transitory machine-readable media of claim 12, wherein making the first message accessible for retrieval comprises storing the first message in an inbox as a hyperlink.

14. The one or more non-transitory machine-readable media of claim 10, wherein the operations comprise: prior to receiving the first message, sending the first application to the source device or sending the second application to the mobile device.

15. A system comprising: a download module for configuring a first mobile device to enable communication between the first mobile device and one or more processing devices of a server, wherein communication is enabled after transmission of an application to the first mobile device, the application for routing messages received from the one or more processing devices; and a message module for (i) receiving a message from a computing device that is directed to a second mobile device, the message being a text message or a voice message, the computing device being different from the first mobile device; and (ii) routing the message to the first mobile device for transmission to the second mobile device from the first mobile device, wherein the message module is configured to synch with the application on the first mobile device to route the message to the application.

16. The system of claim 15, wherein the message module is also for storing the message in an inbox so that the message is accessible via an account associated with the first mobile device.

17. A system comprising: memory for storing instructions that are executable; and one or more processing devices for executing the instructions to perform operations comprising: receiving, from a source device, a first message directed to a mobile device, the first message being a text message or a voice message, wherein the source device comprises a first application for routing messages between the source device and the mobile device via the one or more processing devices; sending the first message to a computing device in response to a request from the computing device, the instructions being executable to execute a computer program to send the first message to the computing device; receiving, from the computing device and at the computer program, a second message, the second message comprising a response to the first message, the second message being an SMS message or a voice message; and sending the second message to the mobile device for transmission to the source device, the instructions for causing the computer program to synch with a second application on the mobile device to perform the sending.

18. The system of claim 17, wherein the operations comprise: determining that the mobile device is registered to enable routing of messages via the one or more processing devices, wherein determining is performed based on an identifier associated with the mobile device.

19. The system of claim 17, wherein the operations comprise making the first message accessible for retrieval; wherein the request comprises a network protocol command.

20. The system of claim 19, wherein making the first message accessible for retrieval comprises storing the first message in an inbox as a hyperlink.

21. The system of claim 17, wherein the operations comprise: prior to receiving the first message, sending the first application to the source device or sending the second application to the mobile device.

\* \* \* \* \*